United States Patent [19]

Bowling et al.

[11] 4,039,050
[45] Aug. 2, 1977

[54] DAMPING SYSTEM

[75] Inventors: George W. Bowling, Olivette; Peter J. Conlisk, Creve Coeur, both of Mo.; Kenneth H. Lenzen, Lawrence, Mass.

[73] Assignee: Monsanto Company, St. Louis, Mo.

[21] Appl. No.: 81,532

[22] Filed: June 7, 1971

Related U.S. Application Data

[62] Division of Ser. No. 824,131, May 13, 1969, Pat. No. 3,691,712.

[51] Int. Cl.² .................................... F16F 7/08
[52] U.S. Cl. ........................................ 188/1 B
[58] Field of Search ...................... 188/1B; 52/309

[56] References Cited

U.S. PATENT DOCUMENTS

| | | |
|---|---|---|
| 3,159,249 | 12/1964 | Lazan ................. 188/1 B |
| 3,160,549 | 12/1964 | Caldwell et al. ......... 188/1 B UX |
| 3,308,586 | 3/1967 | Olson ....................... 52/309 X |
| 3,332,523 | 7/1967 | Chambers ................. 188/1 B X |
| 3,437,332 | 4/1969 | Lee ......................... 188/1 B X |
| 3,605,953 | 9/1971 | Caldwell et al. ............ 188/1 B |

Primary Examiner—Duane A. Reger
Attorney, Agent, or Firm—Henry Croskell; Thomas B. Leslie

[57] ABSTRACT

A method of damping vibrations in building structures by linking an end of a beam to a fixed support by viscoelastic links or damping elements spaced away from the neutral plane of the beam and comprising linking structural members with a viscoelastic damping material sandwiched between and bonded to the structural members, and the damping elements which can be employed as viscoelastic links in such a method.

2 Claims, 8 Drawing Figures

U.S. Patent   Aug. 2, 1977   4,039,050
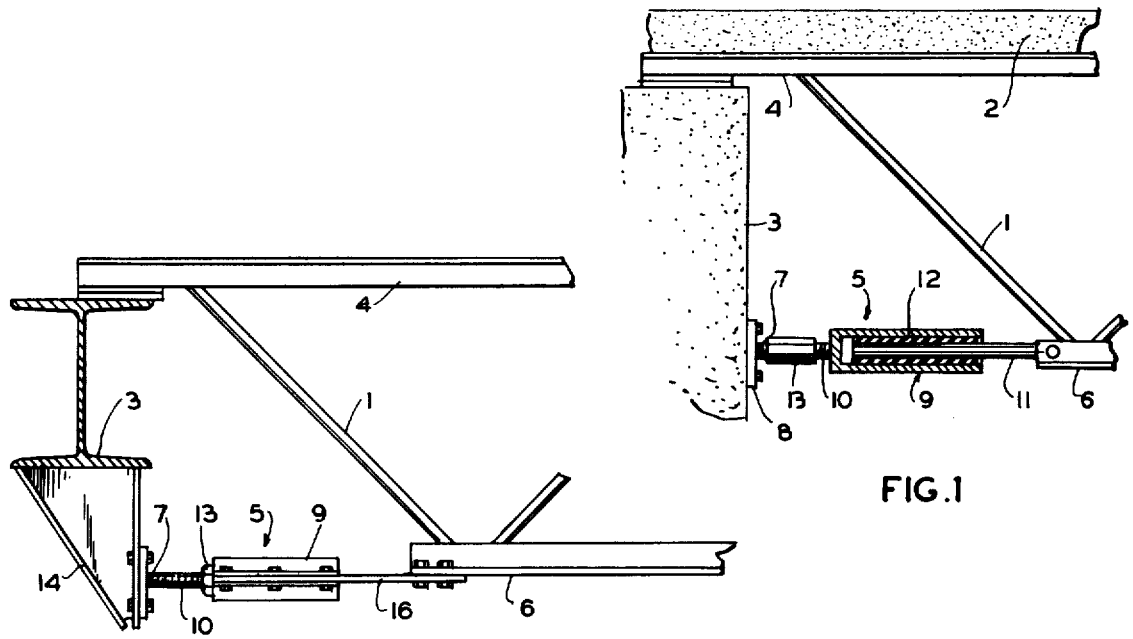
FIG. 1
FIG. 2
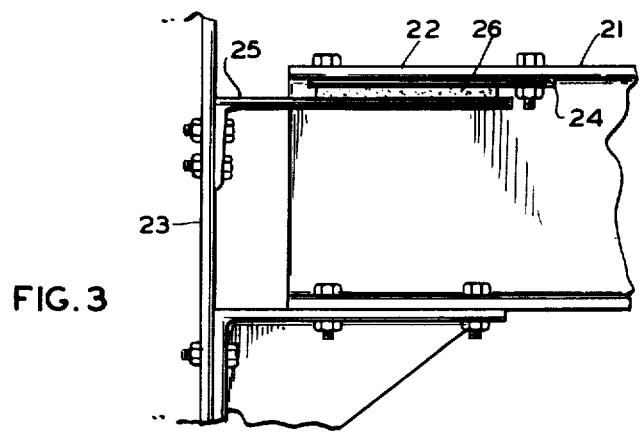
FIG. 3
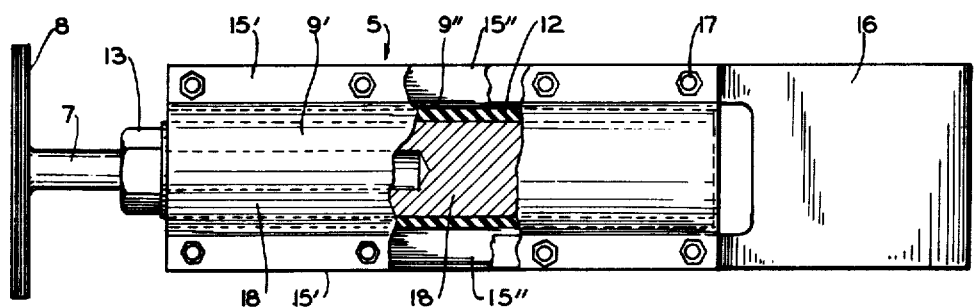
FIG. 4
INVENTORS
KENNETH H. LENZEN
GEORGE W. BOWLING
PETER J. CONLISK
ATTORNEY

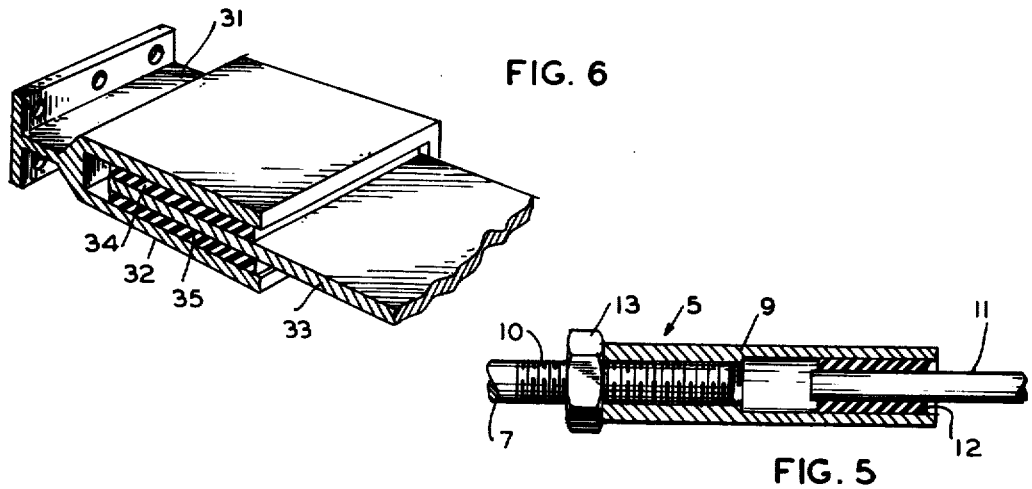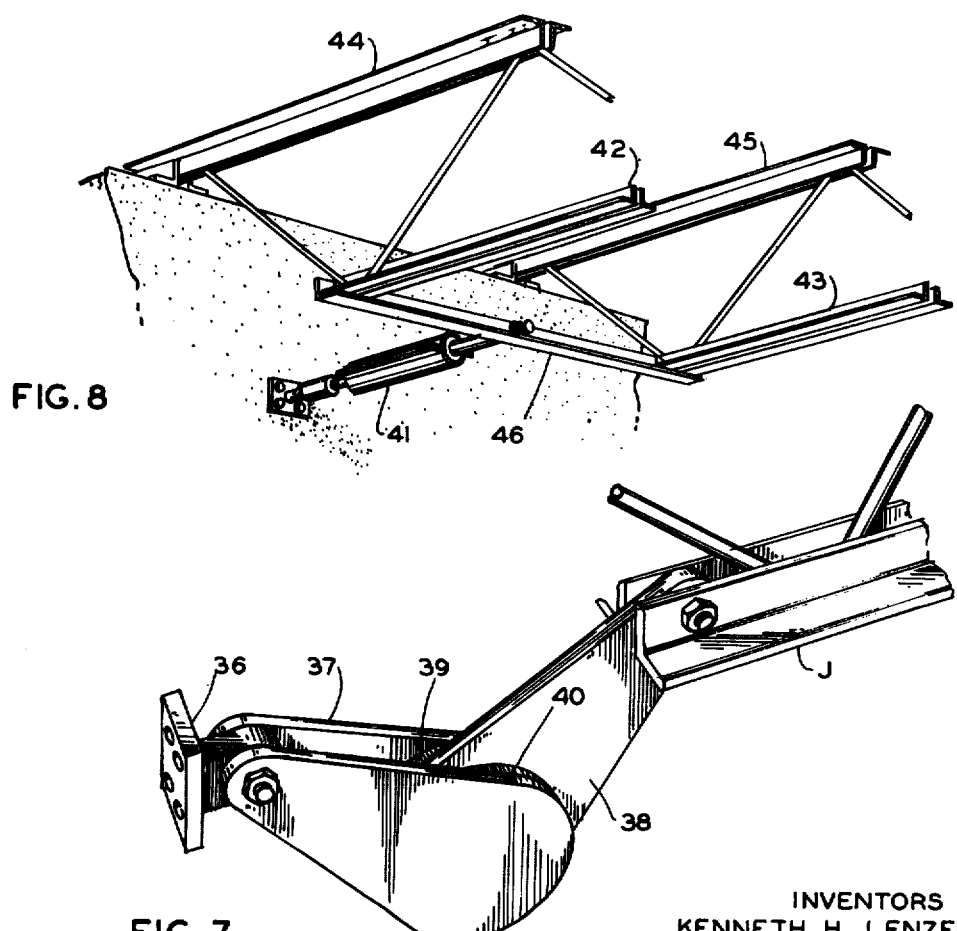

DAMPING SYSTEM

The present application is a division of U.S. Pat. application application Ser. No. 824,131 filed May 13, 1969, now U.S. Pat. No. 3,691,712, issued Sept. 19, 1972.

BACKGROUND OF THE INVENTION

1. Field of the Invention

The invention relates to the damping of vibrations in building structures.

2. Background of the Invention

Building structures and their various elements are subjected to various forces which will induce vibrations in such structures. Some of these forces are of natural origin such as wind, earth tremors and earthquakes. However, such forces generally produce vibrations throughout the entire structure.

Other forces which induce vibrations in building structures arise internally such as those resulting from rapid or impulsive changes in loadings of ceilings and foors. Floors and ceilings of relatively long span frequently have given rise to impulsive response vibrations as a result of varied occupancy thereof, and these vibrations create unpleasant sensations in the occupants of such buildings. With the advent of lighter section beams and joists, such as the light open web steel joists of comparatively recent development, the occurrence of these vibrations has increased and have constituted a considerable problem to the building industry. In some buildings employing relatively long spans of open floors supported by relatively light section beams or open web joists the occurrence of such vibrations induced by one or several people moving from one portion to another of the floor has been sufficient to create most annoying sensations in other occupants of such floors.

Various methods have been proposed to meet the problem posed by these loading vibrations. One such method proposed has been to increase the cross section of the supporting beams and thus increase the stiffness of the entire structure. Another method has been to increase the thickness of the flooring or ceiling material installed on the beams, such as poured concrete, but this also requires a corresponding increase in the size of the supporting beams. Neither of these methods is desirable in that neither is economical of materials or expense in building. Another proposal has been to increase the number of vertical supports of floors and ceilings such as additional columns or partitions installed to decrease the overall spans covered. This again is an uneconomical solution and sometimes one which cannot be adopted when relatively large open areas are required. It has been suggested to coat one or more surfaces of the entire beams with a layer of viscoelastic material additionally backed by relatively stiff materials to afford a shearing action in the viscoelastic, but this has not been adopted because of its high cost and uneconomical use of building materials and labor.

The present invention provides a system or method for damping these disturbing vibrations by the use of viscoelastic materials in a manner which does not require the use of heavier sections of supporting members nor of heavier sections of flooring or ceiling materials. Neither does it require the application of viscoelastic and stiffening materials to the whole of supporting beams or joists either in the field or during manufacture. The present method allows economies to be made in the size and weight of construction materials used while at the same time effectively damping out dynamic vibrations in a simple, economical and novel system.

SUMMARY OF THE INVENTION

The principal object of the present invention is the provision of a vibration damping system effective to reduce dynamic vibrations in floors and ceilings of buildinhg structures to acceptable levels. Another object is the provision of such a vibration damping system which is simple and economical to install in building construction. A further object is the provision of effective damping elements for use in such damping system which are economical to produce and effective for use with various sizes and spans of beams. These and other objects disclosed herein are met by the present invention.

The present invention of a method of damping vibrations in building structures involves the provision of a viscoelastic link between the end of a beam and a fixed support, generally a part of the fixed structure of the building.

Vibrations due to changes in loading occur as bending or flexing of the supporting beam and are reflected as changes in the longitudinal dimensions of those portions of the beam away from its neutral plane. The viscoelastic link is fixedly attached to the end of the beam in a location spaced from the neutral plane of the beam as determined when the beam is part of the floor or ceiling structural system, so that such changes are transmitted to the link and are damped and the mechanical energy converted to heat by means of strain in the viscoelastic linkage. The viscoelastic linkage employed in the system is a damping element comprising structural members adapted for fixed attachment respectively to the beam and to the fixed support and a viscoelastic material sandwiched between and bonded to the structural members. The strain induced in the viscoelastic material by the bending of the beam as the result of dynamic loading serves to damp these vibrations.

BRIEF DESCRIPTION OF THE DRAWING

FIG. 1 is a partial sectional view of the vibration damping system as applied to one system of building construction.

FIG. 2 is a partial sectional view of the vibration damping system as applied to another type of construction.

FIG. 3 is a partial sectional view of such system applied to a different type of building construction.

FIG. 4 is a sectional view partially broken away of one form of damping element employed in the damping system.

FIG. 5 is a sectional view of a modified damping element employed in the system.

FIG. 6 is a perspective view partially in section of a different form of damping element employed in the system.

FIG. 7 is a perspective view of a still different form of damping element employed in the system.

FIG. 8 is a perspective view of a different form of the vibration damping system of the present invention.

DESCRIPTION OF THE PREFERRED EMBODIMENTS

The present invention of the vibration damping system for building structures employs a viscoelastic link between the end of a beam supporting a horizontal building structure such as a floor or ceiling and a fixed support with the viscoelastic link so positioned in relation to the neutral plane of the beam that the bending or flexing of the beam due to dynamic loading results in forces with components acting perpendicularly to the fixed support. The viscoelastic link or damping means between the beam and the fixed support comprises the damping element with structural members fixed respectively to the beam and to the fixed support and the viscoelastic material sandwiched between and bonded to said structural members. The viscoelastic material in order to damp vibrations effectively should exhibit a modulus of elasticity lower than that of the structural members and a corresponding loss factor higher than that of the structural members.

In linking a beam to a fixed support the linking takes place from the end portions of the beam. It is not essential that the extremities of the beam be linked to the supporting member, although this is frequently preferred, but only that the end portions of the beam be so linked. Thus, the linking may be accomplished by attachment of the viscoelastic link or damping means at any point within the extreme two or three feet of a beam, or stated more generally in the extreme 15 percent of any beam so linked. Thus, the attachment of the viscoelastic link or damping means may be made to a portion of the extremity of the beam, just removed from the portion of the beam resting on the fixed support or at some distance toward the center of the beam from the support point as may be required by the dimensions of the support to which the beam is to be linked.

The fixed support to which the beam is linked may be any supporting structure that is part of the fixed, normally rigid supporting structure of the building. Normally this is the same fixed support which is carrying the load of the beam to be damped. The nature of the fixed support will vary with the type of construction involved. Thus it may comprise a masonry, concrete or reinforced concrete wall, a vertical column of steel, reinforced concrete or other material of construction used as major supporting member, or a horizontally disposed girder upon which the beams supporting floors and ceilings are placed.

By the present invention all those types of beams used as part of a floor or ceiling structure can be damped effectively. The present system is adopted most particularly for use with those steel beams commonly used, such as open web steel joists and I-beams. Included within the term I-beam are the steel beams of various sections which are used in a similar manner in building structures, such as wide flange sections, American Standard sections, channels and other sections such as pile sections and built up sections.

In order to be effective in damping vibrations the damping means or viscoelastic link is positioned in spaced relation, i.e. removed from, the neutral plane of the beam to be damped. Since vibrations in beams supporting floors and ceilings occur as bending or flexing of the supporting beam, they result in changes in dimension of all portions of the beam except that at the neutral plane thereof, but with increasing magnitude in those portions most remote from the neutral plane. The damping means employed in the present invention is most effective when located as remote as possible from the neutral plane of the beam to be damped. In practice this will usually mean a location spaced from the neutral plane of from one-quarter to three times the depth of the beam to be damped, although in most cases is will be convenient to locate the attachment or damping means as a projection of the chord of the joist or flange or the beam most remote from its neutral plane. In the case of an I-beam normally supported on its lower flange this will commonly call for location of the viscoelastic link or damping means to the upper flange thereof. In the case of an open-web steel joist the most convenient location is as a projection of the lower chord of the joist. Although the link or damping means may be located either above or below the neutral plane of the beam, it is apparent that in the case of an open-web joist supporting a floor or ceiling the location will normally be below in order not to interrupt the surface of the floor or ceiling.

The location of the viscoelastic link or damping means is also such that the motions in the beam generated as vibrations and damped by the damping means have a substantial component directed perpendicularly to the fixed support. Although this does not require that the link or damping means be positioned parallel to the length of the beam and perpendicular to the fixed support, it is apparent that this disposition of the damping means is the most convenient. The damping means may be set at an angle to the fixed support and the neutral axis of the beam so long as a substantial component of the forces generated by vibration is directed perpendicularly to the fixed support. Thus, if the resultant of forces imposed on the viscoelastic link or damping means is principally in the direction perpendicular to the fixed support and the damping means has sufficient stiffness to resist deflection, effective damping will result. Generally, the minimum stiffness in the direction perpendicular to the fixed support should be at least 350,000 pounds per inch, although higher stiffness is desirable and can be effectively utilized in this system.

The details of the present invention may be more fully comprehended by reference to the several figures of the drawing in connection with the discussion above and further details discussed hereinafter. FIG. 1 isllustrates one preferred embodiment of the present invention wherein an open-web joist 1 is employed as a support for a poured concrete slab 2. The floor is supported by a masonry wall 3 on which the upper chord of the beam, i.e. the flange 4. rests. The viscoelastic link or damping means 5 in FIG. 1 is located as a projection of the lower chord 6 of the open-web joist. The damping means 5 consists of a structural member 7 which is fixedly attached to the wall 3 by means of a mounting plate 8 and wherein the opposite end of the member is a cylinder 9 with an intervening threaded extension 10 and an adjustable turnbuckle element 13, which last element is adapted for adjustment to dead load after erection and pouring of the slab 2. The other structural member of the attachment or damping means comprises a rod-like piston extension 11 from the lower chord 6 of the beam which extends within the cylinder 9. Sandwiched between these two concentric cylindrical structural members is the viscoelastic material 12 in the form of a cylinder which is fixedly bonded to both the structural members 9 and 11. It is this viscoelastic material which serves to damp the vibrations induced in the joist 1 by variations in loading of the foor which is the surface of the slab 2. It will be apparent that the forces induced in lower chord 6 of joist 1 as a result of variations in dynamic loading will act perpendicularly to the supporting wall 3 and in the plane of the viscoelastic link or damping means 5. The same arrangement of parts would be adopted if in place of the supporting wall 3 there had been used in the construction of the building a deep and wide-flanged I-beam whose lower flange was below the center line of the attachment means 5, ie. the projection of the lower chord of the open-web joist 6, in the same manner as the mounting on the masonry wall which is illustrated in FIG. 1.

An alternative arrangement of a similar viscoelastic link or damping means to link such an open web joist to a supporting I-beam which is not so deep as the joist is illustrated in FIG. 2. In this arrangement the damping means 5 is attached to a depending flanged connector or angle 14 which is fixed to the lower flange of the I-beam 3. The damping means 5 shown in detail in FIG. 4 consists of a structural member or shaft 7 which has an end 10 threaded into a piston within the cylinder 9 of the damping means and adjustably fixed to said piston by lock nut 13. The cylinder 9 is fixed to the lower chord 6 of the open web joist 1 by an extension of yoke 16. In this arrangement the vibrational forces in lower chord 6 will be transmitted at an angle to the supporting member 3 but with a substantial component acting perpendicularly thereto, while the damping means 5 is positioned parallel to the beam and as a projetion of the lower chord 6 thereof.

For other systems of building erection there may be employed other types of attachment means. In FIG. 3 there is illustrated the use of the method of the present invention to link the upper flange 22 of an I-beam 21 to a vertical column 23. In this alternative the attachment means comprises a plate 24 fixedly attached to the upper flange 22 of the I-beam 21 together with an angle bracket 25 for mounting on the vertical column 23. There is sandwiched between the plate 24 and bracket 25 viscoelastic material 26 which is bonded to both the plate and bracket. In the alternative design and arrangement of the damping means illustrated in FIG. 3 such means is spaced apart from the neutral plane of the beam being damped more than one-half the depth to the beam, depending upon the thickness and nature of the flooring or roofing slab carried thereby.

An alternative design for the viscoelastic link or damping means which can be employed in the same manner as illustrated in FIG. 1 is that shown in FIG. 4. In this design the damping means or element 5 consists of a cylindrical shell made in two halves 9' and 9" which are provided with flanges 15' and 15" and a flat yoke 16 positioned between the flanges 15' and 15" with an extension provided for attachment to a beam. The flanges 15' and 15 " and the yoke 16 are secured together by welding, riveting or bolting by bolts 17, as shown. Within the shell halves is positioned a layer of viscoelastic material 12 which is bonded to the shell halves 9' and 9" and also to the piston 18 which is carried by the shaft 7. Shaft 7, fixed to mounting plate 8, is threaded into piston 18 for final adjustment and fixed therein by means of lock nut 13. The cylindrical shell halves 9' and 9" when joined together with yoke 16 and the extension thereof are adapted to be fixed to the lower chord of an open web joist or other form of beam by welding, riveting, bolting or in any other suitable manner.

Other alternative forms of viscoelastic link or damping means can be employed in the present method. One such is illustrated in FIG. 5 wherein the cylinder 9 of the damping means or element 5 is carried on a rod 7 which is provided with a threaded end 10 and lock nut 13 suitable for making final adjustment of the damping means. In the same manner as illustrated in FIG. 1 the cylindrical rod 11 comprises the other structural member between which and cyliner 9 there is sandwiched and bonded the viscoelastic material 12 which is cylindrical in form.

Another alternative form of damping means is illustrated in FIG. 6 wherein the structural member for fixed attachment to the fixed support comprises a bracket 31 carrying a yoke 32 at one end and the other structural member is a plate 33 disposed within the arms of yoke 32. There is sandwiched between both arms of yoke 32 and the respective faces of plate 33 sheets of viscoelastic material 34 and 35 which are fixedly bonded to the inner faces of yoke 32 and the opposite faces of plate 33. This form of attachment means is suitably provided with stiffening means to prevent buckling in the plane parallel to the arms of yoke 32 and plate 33. These may comprise sidewalls for yoke 32 attached at either side or other suitable means to prevent such buckling.

A further alternative form of damping means which can advantageously be used to avoid an intervening structural member is illustrated in FIG. 7. In this form of the damping means the vibrational forces are damped by torsion in the viscoelastic material. The damping element in FIG. 7 consists of a yoke 37 and plate 38 which form an obtuse angle and which may be elliptical in shape. The yoke 37 is adapted to be fixed to either the lower chord of an open web joist J or a mounting plate or other means 36 fixed to a fixed building support and the plate 38 to the other. The end of the plate 38 extends between the ends of the yoke 37 and is joined thereto by two layers of viscoelastic material 39 and 40 which are sandwiched between and bonded to the opposite faces of the plate 38 and the interior faces of the yoke 37. In the form illustrated in FIG. 7 the layers of viscoelastic material are discs. It is desirable that adjustment means, not shown, be provided for making final adjustments in length. This form of the damping element is positioned so that its center does not lie on the projection of the lower chord of the joist J to which it is attached. However, a substantial component of the vibrational forces in such joist acts parallel to the neutral plane thereof and perpendicular to the fixed support to which the damping element is attached. These forces are damped by torsion induced in the viscoelastic material 39 and 40 by motions in the joist.

In employing the present method for damping vibrations it is contemplated that the number of beams in a given structure which require damping in order for same to be effective will vary widely with the type of construction used and the spans to be covered. It is generally adequate to fix damping means to only the center two-thirds of the beams or joists employed to cover a given area, and sometimes fewer. One frequent alternative which may be employed is to attach damping means to alternate ends of alternate joists and this likewise has been found to be satisfactory and to result in effective damping. Another alternative available is illustrated in FIG. 8 where it can be seen that damping means 41 is positioned parallel to the lower chords 42, 43 but positioned between two successive joists 44, 45 by employing a bridging member 46 between the ends thereof. In this alternative the vibrations induced in both joists are effectively damped by means of the viscoelastic link or damping means 41 wherein the vibrations from both joists are damped.

In the case of relatively long span beams to be damped it has been found not essential to employ a greatly increased size in the viscoelastic link or damping means. In some instances it is desirable to locate a plurality of such links or damping means at one or both ends of the long span beam to be damped. Thus, it is not necessary to locate each of the damping means at the same end on the same plane or attached at the same point to the beam. Use of a plurality of such links or damping means on a single end of a single beam is practical and is contemplated within the present invention.

In light of the flexibility of the present method as exemplified above it is possible to design and fabricate only a few varied sizes of viscoelastic links or damping elements which will be suitable for use with a great variety of sizes and spans of beams and joists and by various alternative combinations thereof to effectively damp vibrations in such varied beams and joists.

The viscoelastic material employed in all the alternative damping means or elements used in the present method can be quite varied and with somewhat different properties. It is, of course, apparent that such viscoelastic material requires a modulus of elasticity lower than that of the structural members to which it is bonded. Typically the viscoelastic material will possess a modulus of elasticity at least one order of digits lower than that of any structural member. Generally, for example, the shear modulus of elasticity of the viscoelastic material should be at least 50 pounds per square inch and preferably such modulus of elasticity should be between 50 and 1000 pounds per square inch. However, depending on the fixed support to which the forces are directed the material could have a higher shear modulus of elasticity if the supporting member were sufficiently strong. The above preferred limits are those found suitable with general types of construction including masonry walls. The most preferred level for the shear modulus of elasticity of the viscoelastic material chosen has been found to lie between approximately 100 and 300 pounds per square inch.

Likewise the viscoelastic material must possess a loss factor higher than that of the structural members to which it is bonded. Typically, the viscoelastic material will display a loss factor at least one order of digits higher than that of any structural member. The loss factor is a measure of the amount of imposed energy absorbed and dissipated by strain within the viscoelastic material. This loss factor in shear should be at least 0.3 for most effective vibration damping. Preferably the loss factor in shear should be 0.6 or greater.

The desired modulus of elasticity and corresponding loss factor of suitable viscoelastic materials, or discussed above, should generally be present at those temperatures at which the present damping system will be employed. Those ranges stated above for shear modulus of elasticity and loss factor in shear are for room temperatures. All elements of the present system are generally placed within the outer walls and roof structures of buildings. In general, such buildings for which damping of loading vibrations are desired are buildings designed for occupancy by people and, hence, are heated in cold climates. Therefore, the normal temperature range of use of the viscoelastic materials used in the present invention is from approximately 0° to 30° C, and it is preferable that the stated modulus of elasticity and loss factor be present across this range of temperatures. It is more preferable that they be present across a range of −10° to 50° C, for location in certain types of structures in extreme climates.

Suitable viscoelastic materials exhibiting these properties may be selected from a wide list of such materials. For example they can be selected from the vinyl chloride and fluoride polymers and copolymers such as copolymers of vinyl chloride/vinyl acetate and vinyl chloride/ethylene, plasticized to various degrees. Likewise they can be selected from such polymers as polysulfide rubbers, polyurethane rubbers, butyl rubbers or butadiene polymers and copolymers. Also suitable are neoprene, polytetrafluoroethylene, polytrifluorochloroethylene, and polyvinyl ethers, such as polyvinyl isobutyl ether and polyvinyl tertiary-butyl ether. Since it has generally been found that filled polymers exhibit greater capacity for damping vibrations than unfilled polymers, such filled polymers are preferred. Particularly preferred are those filled polymers with fillers in fine platelet form, such as nonamorphous graphite, micas, asbestor, talc and flaked metals.

In order to be effective for damping vibrations the viscoelastic materials used must be fixedly bonded to the structural members of the linking or damping means. Normally this is accomplished by means of cements or adhesives. For this purpose there may be employed any of the numerous, commercially available materials such as thermoplastic or thermosetting synthetic resin adhesives. For best results the stiffness of the adhesive after set should be equal to or greater than the stiffness of the viscoelastic material being bonded. Therefore, a rigid, thermosetting type of adhesive is preferred, such as an epoxy, furan, silicone, phenolic, melamine, urea or polyester adhesive. Inorganic adhesives, such as litharge or magnesium oxychloride cements can also be useful. Most preferred among adhesives for bonding the viscoelastic material is a solventless epoxy adhesive of which there are several varieties available commercially.

The size of the layer of viscoelastic material employed in the viscoelastic links or damping means of the present invention can be broadly varied to accomodate any normal building damping requirements. The thickness of this layer should be only sufficient to afford the desired amount of strain in the damping element. Generally, this has been found to range from about 0.05 to 0.5 inch but can be made thicker if desired. The area of the viscoelastic material layer can be made to any size desired. However, in the interest of economy of material it is generally favored to design the surface area of the viscoelastic layer to be between 10 and 500 square inches. Within this range of surface areas there can be designed a great variety of sizes, shapes and capacities of damping means or elements sufficiently varied to accomodate any desired vibration intensity on any size building structure. It is generally desirable to use only that amount of viscoelastic material which is sufficient to damp anticipated vibrations. For example it has been found sufficient to employ a damping means or element with a thickness of 0.1 inch of viscoelastic material having a surface area of 30 square inches for damping vibrations in a 20 foot span open-web steet joist when one such attachment means is placed at each end of said joist and the joists have been arranged on two-foot centers.

There has been described above a vibration damping system effective to reduce vibrations in building structures to levels undetectable by occupants of the buildings. This novel system is extremely flexible and economical in the use of materials in that a great variety of system arrangements are available which can use a relatively few uniform sizes of damping means or damping elements for their execution. Thus, as has been described above, the system is adapted for use on beams in several arrangements, such as on both ends of a single beam, on alternate ends of alternate beams, between the ends of bridged beams, and for use on those beams supporting the central portion of large area floors or ceilings only. Likewise, there is great variation in the type of building structures to which the present system can be applied, such as those of masonry or concrete walls, steel framework or reinforced concrete framed buildings. The present system is useful with buildings employing beams and joists of any of the common commercial spans. Consequently, the damping system of the present invention is broadly applicable to a very wide range of present commercial building designs. Furthermore, the damping means or damping elements used in the present damping system can be economically produced in a relatively few standard sizes for use with all variety and spans of beams now marketed. The present system can be installed in an extremely economical manner during building construction and can be added to existing buildings with a minimum of reconstruction required therein. Thus, the damping system of the present invention possesses many advantages in its flexibility and adaptability to a broad range of current building designs while at the same time effectively damping vibrations in floor and ceiling structures in a novel and effective manner.

It is to be understood that changes and variations may be made without departing from the spirit and scope of the invention as defined in the appended claims.

We claim:

1. A vibration damping element for floor and ceiling structures comprising structural members adapted for attachment repectively to said structure and to a fixed support, at least one of said structural members provided with a length adjusting means, and a viscoelastic material sandwiched between and bonded to said structural members, said viscoelastic material having a modulus of elasticity lower than that of the structural members and a loss factor higher than that of the structural members.

2. A vibration damping element for floor and ceiling structures comprising structural members adapted for attachment respectively to said structure and to a fixed support and a viscoelastic material sandwiched between and bonded to said structural members, said structural members comprising a plate and a yoke forming an angle therebetween and adapted to place said viscoelastic material in torsion said viscoelastic material having a modulus of elasticity lower than that of the structural member and a loss factor higher than that of the structural members.

* * * * *